(12) United States Patent
Waltermann et al.

(10) Patent No.: US 10,470,113 B2
(45) Date of Patent: Nov. 5, 2019

(54) USAGE OF NETWORK BASED ON QUALITY OF NETWORK AT A PARTICULAR LOCATION

(71) Applicant: Lenovo (Singapore) Pte. Ltd., New Tech Park (SG)

(72) Inventors: Rod D. Waltermann, Rougemont, NC (US); Arnold S. Weksler, Raleigh, NC (US); Nathan J. Peterson, Oxford, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/963,608

(22) Filed: Dec. 9, 2015

(65) Prior Publication Data

US 2017/0171804 A1 Jun. 15, 2017

(51) Int. Cl.
| | |
|---|---|
| H04B 17/00 | (2015.01) |
| H04W 48/18 | (2009.01) |
| H04W 4/02 | (2018.01) |
| H04W 12/06 | (2009.01) |
| H04W 24/08 | (2009.01) |
| H04L 12/721 | (2013.01) |

(52) U.S. Cl.
CPC ............ *H04W 48/18* (2013.01); *H04L 45/70* (2013.01); *H04W 4/025* (2013.01); *H04W 12/06* (2013.01); *H04W 24/08* (2013.01)

(58) Field of Classification Search
CPC ..... H04W 48/18; H04W 4/025; H04W 12/06; H04W 24/08; H04W 48/16

USPC ....................................................... 455/67.11
See application file for complete search history.

(56) References Cited

U.S. PATENT DOCUMENTS

| | | | | |
|---|---|---|---|---|
| 8,781,479 B2* | 7/2014 | Mao | ...................... | H04W 48/18 455/436 |
| 8,818,331 B2* | 8/2014 | Mohammed | .......... | H04M 15/70 455/406 |
| 8,867,575 B2* | 10/2014 | Mohammed | ........ | H04L 63/0428 370/546 |
| 8,903,377 B2* | 12/2014 | Jouin | .................... | G06F 3/1438 455/426.1 |

(Continued)

OTHER PUBLICATIONS

Arnold S. Weksler, Rod D. Waltermann, John Carl Mese, Nathan J. Peterson, Russell Speight Vanblon, "Dynamic Pricing for Use of Network", file history of related U.S. Appl. No. 14/963,542, filed Dec. 9, 2015.

(Continued)

*Primary Examiner* — April G Gonzales
(74) *Attorney, Agent, or Firm* — John L. Rogitz; John M. Rogitz

(57) ABSTRACT

In one aspect, a first device includes a processor, a display accessible to the processor, and storage accessible to the processor. The storage bears instructions executable by the processor to determine a quality, at a location, of service for a service of a particular cellular service type, where the service is associated with a cellular service provider. The instructions are also executable to, based on the quality of service at the location, use subscriber identification module (SIM) data to communicate at least with a second device through the service, the second device being different from the first device.

16 Claims, 8 Drawing Sheets

(56) References Cited

U.S. PATENT DOCUMENTS

| | | | |
|---|---|---|---|
| 8,958,773 B2* | 2/2015 | Mohammed | H04M 15/70 455/406 |
| 9,094,538 B2* | 7/2015 | Mohammed | H04M 15/70 |
| 9,313,643 B1 | 4/2016 | Ghoshal et al. | |
| 9,398,169 B2* | 7/2016 | Mohammed | H04M 15/70 |
| 2004/0133668 A1 | 7/2004 | Nicholas | |
| 2007/0294421 A1 | 12/2007 | Octaviano et al. | |
| 2008/0064443 A1* | 3/2008 | Shin | H04M 1/72519 455/558 |
| 2011/0110376 A1* | 5/2011 | Jiang | H04L 45/60 370/394 |
| 2012/0122441 A1* | 5/2012 | Kim | H04W 28/18 455/418 |
| 2012/0129513 A1 | 5/2012 | Laak | |
| 2012/0149372 A1* | 6/2012 | Lee | G01S 5/02 455/435.1 |
| 2012/0302284 A1 | 11/2012 | Rishy-Maharaj et al. | |
| 2013/0023309 A1 | 1/2013 | Holtmanns et al. | |
| 2013/0132854 A1* | 5/2013 | Raleigh | G06F 3/0482 715/738 |
| 2014/0105069 A1 | 4/2014 | Potnuru | |
| 2014/0199962 A1 | 7/2014 | Mohammed et al. | |
| 2014/0228039 A1 | 8/2014 | Zhao et al. | |
| 2014/0324622 A1 | 10/2014 | Ball et al. | |
| 2015/0079986 A1* | 3/2015 | Nayak | H04W 52/0229 455/435.2 |
| 2015/0215738 A1* | 7/2015 | Frusina | H04W 4/023 455/426.1 |
| 2015/0289221 A1* | 10/2015 | Nayak | H04W 60/005 455/435.1 |
| 2015/0334761 A1* | 11/2015 | Liao | H04W 76/16 455/552.1 |
| 2016/0029204 A1* | 1/2016 | Lalwaney | H04W 8/22 455/418 |
| 2016/0055537 A1 | 2/2016 | Tiger et al. | |
| 2016/0095157 A1 | 3/2016 | Wenzel et al. | |
| 2016/0204951 A1 | 7/2016 | Walton et al. | |
| 2016/0210578 A1 | 7/2016 | Raleigh et al. | |
| 2016/0345377 A1 | 11/2016 | Lindoff et al. | |
| 2016/0360456 A1 | 12/2016 | Vashi et al. | |
| 2017/0026773 A1 | 1/2017 | Paz et al. | |
| 2017/0034643 A1 | 2/2017 | Young et al. | |
| 2017/0171804 A1 | 6/2017 | Waltermann et al. | |

OTHER PUBLICATIONS

"Virtual Sim", IQsim, Retrieved on Sep. 23, 2015 from http://www.iqsim.com/VirtualSIM.en.htm.

Arnold S. Weksler, Rod D. Waltermann, John Carl Mese, Nathan J. Peterson, Russell Speight Vanblon, "Dynamic Pricing for Use of Network", related pending U.S. Appl. No. 14/963,542, applicant's response to non-final office action filed Dec. 28, 2016.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Non-Final Office Action dated Oct. 28, 2016.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Non-Final Office Action dated Dec. 26, 2017.

Arnold S. Weksler, Rod D. Waltermann, John Carl Mese, Nathan J. Peterson, Russell Speight Vanblon, "Dynamic Pricing for use of Network", related pending U.S. Appl. No. 14/963,542, final office action dated Mar. 31, 2017.

Arnold S. Weksler, Rod D. Waltermann, John Carl Mese, Nathan J. Peterson, Russell Speight Vanblon, "Dynamic Pricing for use of Network", related pending U.S. Appl. No. 14/963,542, applicant's response to final office action filed Jun. 28, 2017.

Rnold S. Weksler, Rod D. Waltermann, John Carl Mese, Nathan J. Peterson, Russell Speight Vanblon, "Dynamic Pricing for Use of Network", related pending U.S. Appl. No. 14/963,542, applicant's response to non-final office action filed Jan. 16, 2018.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Final Office Action dated Apr. 18, 2018.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Applicant's response to Final Office Action filed Jun. 25, 2018.

Arnold S. Weksler, Rod D. Waltermann, John Carl Mese, Nathan J. Peterson, Russell Speight Vanblon, "Dynamic Pricing for Use of Network", file history of related U.S. Appl. No. 16/016,018, filed Jun. 25, 2018.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Applicant's response to Non-Final Office Action filed Nov. 21, 2018.

Arnold S. Weksler, Rod D. Waltermann, John Carl Mese, Nathan J. Peterson, Russell Speight Vanblon, "Dynamic Pricing for Use of Network", related U.S. Appl. No. 16/016,018, Final Office Action dated Jan. 28, 2019.

Arnold S. Weksler, Rod D. Waltermann, John Carl Mese, Nathan J. Peterson, Russell Speight Vanblon, "Dynamic Pricing for Use of Network", related U.S. Appl. No. 14/963,542, Final Office Action dated Jan. 17, 2019.

Arnold S. Weksler, Rod D. Waltermann, John Carl Mese, Nathan J. Peterson, Russell Speight Vanblon, "Dynamic Pricing for Use of Network", related U.S. Appl. No. 16/016,108, Non-Final Office Action dated Sep. 20, 2018.

Arnold S. Weksler, Rod D. Walterman, John Carl Mese, Nathan J. Peterson, Russell Speight Vanblon, "Dynamic Pricing for Use of Network", related U.S. Appl. No. 14/963,542, Non-Final Office Action dated Aug. 28, 2018.

Arnold S. Weksler, Rod D. Waltermann, John Carl Mese, Nathan J. Peterson, Russell Speight Vanblon, "Dynamic Pricing for Use of Network", related U.S. Appl. No. 16/016,018, Applicant's response to Final Office Action filed May 24, 2019.

* cited by examiner

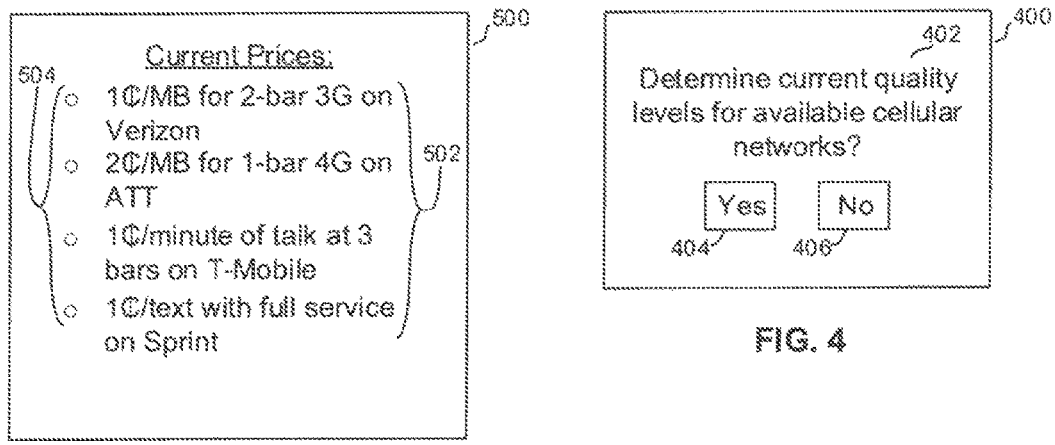
FIG. 4
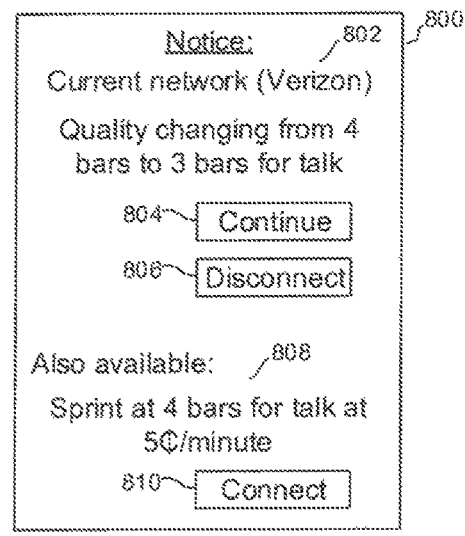
FIG. 5
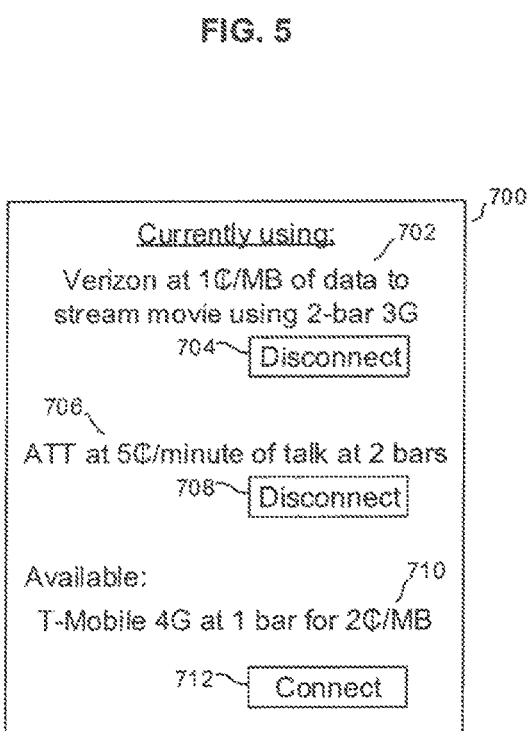
FIG. 7
FIG. 8

| Available Bandwidth | Price |
|---|---|
| A-B of 3G | 1 ¢/MB |
| C-D of 3G | 2 ¢/MB |
| E-F of 4G | 3 ¢/MB |
| G-H of 4G | 3.5 ¢/MB |

FIG. 11

Enter price:

[1202] ¢ per [1204] MB

When bandwidth between:

[1206] and [1208]

FIG. 12

USAGE OF NETWORK BASED ON QUALITY OF NETWORK AT A PARTICULAR LOCATION

FIELD

The present application relates generally to usage of a network based on a quality of the network at a particular location.

BACKGROUND

As recognized herein, in many places around the globes, users wishing to communicate using a cellular network can only access one such network using their device, and cannot access another cellular network without physically removing one subscriber identification module (SIM)—often, called a "SIM card"—from the device that is usable with the first network and replacing it with another SIM for use with the other cellular network. This can be burdensome, laborious, and confusing, to say the least.

Furthermore, even when a user does so, the user is still typically required to enter into relatively long term and costly contracts with the operators of these cellular networks in order to communicate over the networks using the different SIMs. Users thus opt to, more often than not, commit to but one contract and communicate over but one cellular network using their device. However, communicating over a single cellular network can be frustrating at times too, such as when the cellular network does not have ample available bandwidth to support the user's needs.

SUMMARY

Accordingly, in one aspect a first device includes a processor, a display accessible to the processor, and storage accessible to the processor. The storage bears instructions executable by the processor to determine a quality, at a location, of service for a service of a particular cellular service type, where the service is associated with a cellular service provider. The instructions are also executable to, based on the quality of service at the location, use subscriber identification module (SIM) data to communicate at least with a second device through the service, the second device being different from the first device.

In another aspect, a method includes identifying a quality, at a location of a device, of at least a first available cellular service and presenting an option at the device indicating information pertaining to the quality. The option is selectable to command the device to communicate through the first available cellular service. The method further includes receiving a selection of the option and communicating through the first available cellular service using the device in response to receiving the selection of the option.

In still another aspect, a method includes operating a cellular network and providing a pricing parameter to a device. The pricing parameter pertains to a one-time use of the cellular network while the cellular network is available at a particular quality level.

In yet another aspect, a method includes determining a quality, at a location, of service for a service of a particular cellular service type. The method also includes, based on the quality of service at the location, using subscriber identification module (SIM) data stored at a first device to communicate at least with a second device through the service. The service is associated with a cellular service provider, and the second device is different from the first device.

The details of present principles, both as to their structure and operation, can best be understood in reference to the accompanying drawings, in which like reference numerals refer to like parts, and in which:

BRIEF DESCRIPTION OF THE DRAWINGS

FIGS. 4-9 and 12 are example user interfaces (UI) in accordance with present principles; and FIG. 11 is an example data table in accordance with present principles.

DETAILED DESCRIPTION

Figure 1:
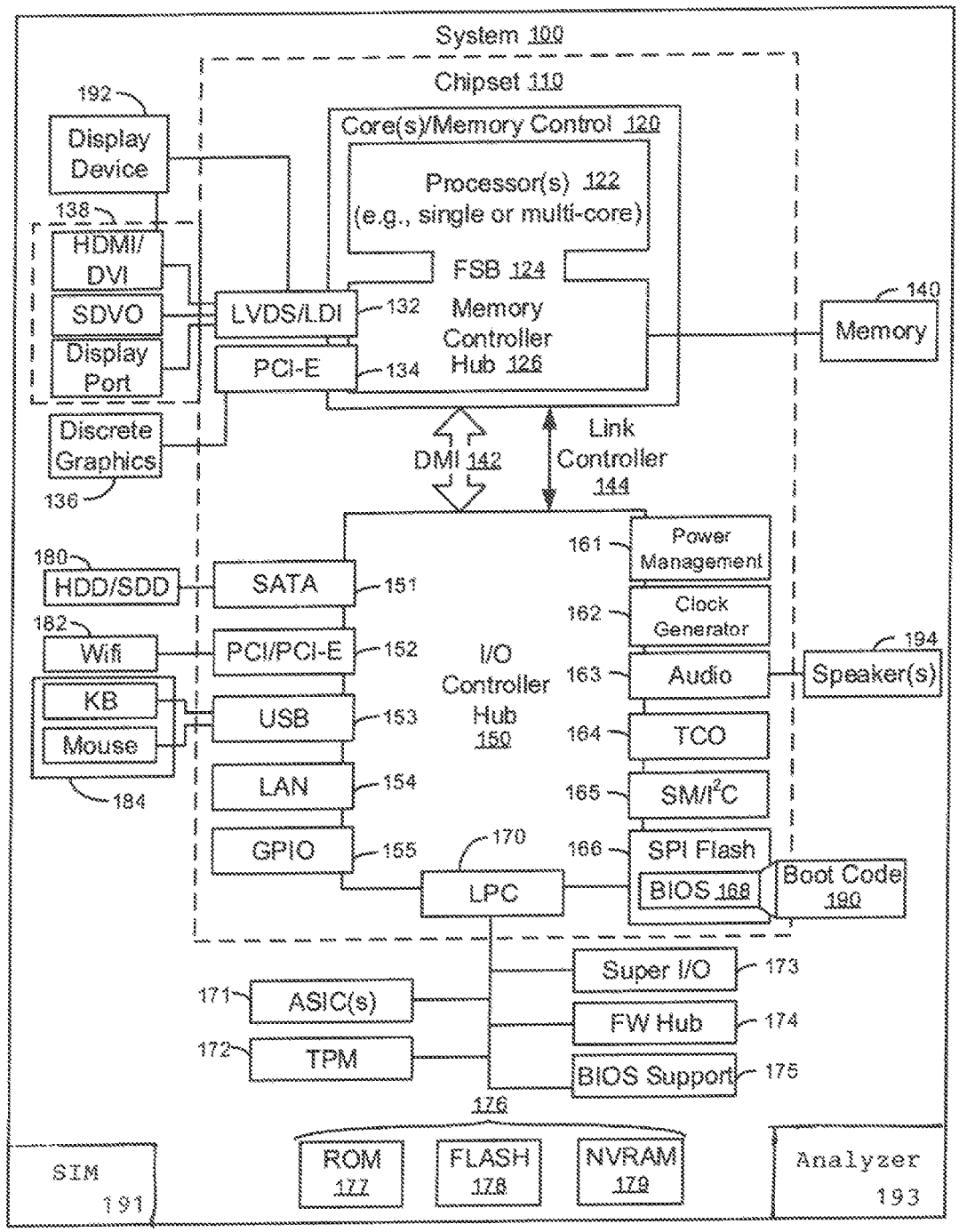
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as fee Internet a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional, "northbridge" style architecture.

The memory controller hub 126 interfaces with memory 140. For example, the memory controller hub 126 may provide support for DDR SDRAM memory (e.g., DDR, DDR2, DDR3, etc.). In general the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interlace 154 (more generally a network interface for communication over at least one network such as the internet, a WAN, a LAN, etc. under direction of the processor(s) 122), a general purpose I/O interface (GPIO) 155, a low-pin count (LPC) Interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interlace (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interlace 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 also includes a subscriber identification module (SIM) 191. The SIM 191 is understood to be usable in accordance with present principles, such as to store plural sets of "virtual" SIM data that is used by the system 100 to respectively communicate over different (e.g., at least partially wireless) cellular networks, such as using various sets of international mobile subscriber identity (IMSI) numbers and authentication keys.

Still further, in some embodiments the system 100 may include one or more analyzers 193, such as a signal analyzer and/or spectrum analyzer for determining a strength of cellular signals at a location of the system 100, determining an amount of coverage and/or service of a cellular network at a location of the system 100, determining an amount of available bandwidth of a cellular network at a location of the system 100, etc.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on, e.g., a user providing audible input to the microphone, and a camera that gathers one or more images and provides input related thereto to the processor 122. The camera may be a thermal imaging camera, a digital camera such, as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
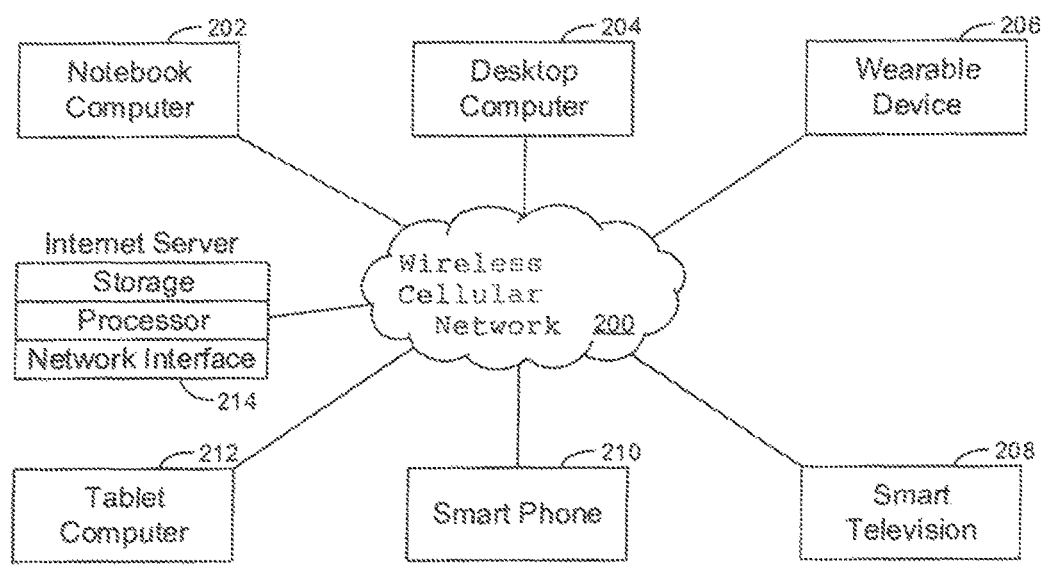
FIG. 2 is a block diagram of a network of devices in accordance with present principles.

Turning now to FIG. 2, example devices are shown communicating over one or more cellular networks 200 through which telephone calls may be placed, and the Internet accessed, in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212, it is to be understood that the devices 202-214 are configured to communicate with each other over the cellular networks 200 to undertake present principles. The networks 200 themselves may be respectively operated by different operators, carriers, providers, etc., and be established by various cells, base stations, and/or communication towers having, e.g., fixed-location transceivers.

Figure 3:
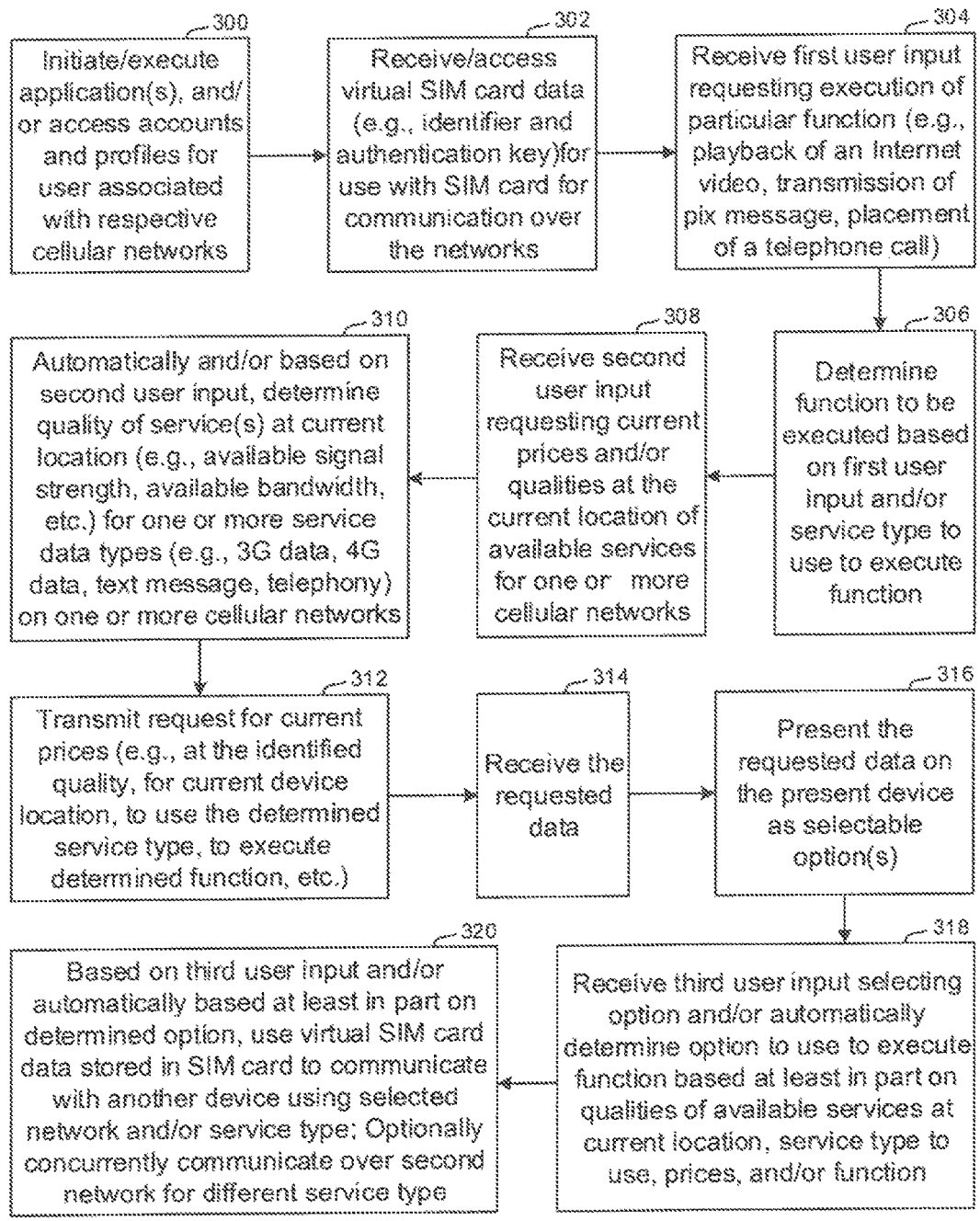
FIGS. 3 and 10 are flow charts showing example algorithms in accordance with present principles.

Referring to FIG. 3, it shows example logic that may be undertaken by a device such as the system 100 for determining, viewing, and/or selecting various network qualities of different cellular networks to perform a function at a particular location of a device undertaking the logic of FIG. 3 in accordance with present principles (referred to when describing FIG. 3 as the "present device"). Beginning at block 300, the logic initiates and/or executes one or more applications for undertaking present principles, such as an Internet application, a wireless carrier-provided application, a virtual SIM application, a signal and/or spectrum, analyzer application, etc. In some embodiments and also at block 300, the logic may access one or more accounts and/or profiles for a particular user of the present device, such as accessing a user's accounts for each of plural cellular network operators/providers. The accounts and/or profiles may be accessed using one or more of the applications launched at block 300, and may be accessed over the Internet, over one of the cellular networks, etc.

From block 300 the logic may proceed to block 302. At block 302 the logic may receive, access, and/or store (e.g., in a physical SIM (such as a SIM "card") housed in the present device) "virtual" subscriber identification module (SIM) data that is usable for the present device to identify and authenticate itself to a network it seeks to join to then communicate with other devices using the network. The virtual SIM data (for one or more cellular networks) may be stored in the SIM itself, and/or at another storage location within or accessible to the present device. The virtual SIM data may comprise items such as an identification/identity number that identifies the present device, a network subscriber, and/or an account (e.g., associated with the user) for accessing the associated network, such as an international mobile subscriber identity (IMSI) number. In addition to still other information (such as temporary network information, data regarding accessible network services for the user/device, and passwords such as a personal identification number (PIN) and a personal unblocking code (PUK) usable for PIN unlocking), the virtual SIM data may also comprise an authentication key that is useable to authenticate the present device, subscriber, and/or account with the operator/carrier and/or associated network.

The virtual SIM data for each network operator/carrier may be received from each respective operator/carrier of each network (e.g., using an Internet connection and prior to execution of the logic of FIG. 3), and/or may be already stored at the present device at the time of purchase of the present device from a manufacturer or seller of the present device. However, also note that in some embodiments, the virtual SIM data may be received, accessed, and/or stored at a later point as well, such as when requesting prices for usage of various networks as will be described further below.

From block 302, the logic of FIG. 3 then moves to block 304. At block 304 the logic receives first user input requesting and/or commanding execution at the present device of a particular function, such as playback of an Internet video, transmission of a text message and picture, and/or placement of a telephone call. The first user input may be received based at least in part on touch input received to a user interface (UI) presented on a display of the present device. Responsive to receipt of the user input at block 304, the logic moves to block 306.

At block 306 the logic determines a function to be executed based on the first user input received at block 304, such as determining that the function is playback of a video to be streamed over the Internet based on user input selecting a file of a video file type. Also at block 306, the logic may determine a type of cellular service to use to at least in part execute the function, such as cellular Internet service (e.g., 3G or 4G) or cellular telephony service (e.g., Code Division Multiple Access (CDMA) or Global System for Mobiles (GSM)).

From block 306 the logic moves to block 308. At block 308 the logic may receive second user input requesting one or more current prices for the service(s) determined at block 306 and/or current prices for performing the function to be executed determined at block 306. The services may include, e.g., Internet service over a particular cellular network, Internet service over another network, and telephony service over still another network. In addition to or in lieu of the foregoing, but also at block 308, the logic may receive second user input requesting presentation on the present device of information regarding the qualities of currently available cellular services, such as available bandwidth on various cellular networks detected by the present device and/or strength of communication signal between the present device and a cellular tower or base station of the cellular network. The user input received at block 308 may be touch input received at a touch-enabled display on the present device, and in some examples the touch input may be directed to a selector on a user interface (UI) such as the one to be described below in reference to FIG. 4.

From block 308 the logic proceeds to block 310 where, based on the second user input received at block 308 or automatically without the second user input but instead, e.g., based on predefined settings, the logic determines the quality of one or more currently available cellular services. The logic may do so by operating and receiving input from a signal analyzer and/or a spectrum analyzer on the present device for measuring and identifying the magnitude, frequency, and/or power of various cellular signals (e.g., of different service types). In some embodiments, magnitude and/or power may be directly correlated and/or proportional to signal strength, where signal strength for a particular cellular signal may be one measure of service quality. Also in some embodiments, the amount of bandwidth may be determined by analyzing the maximum data throughput for a spectrum in bits per second, where bandwidth amount may be another measure of service quality. Another measure of service quality may be the width or size of a signal spectrum for a particular carrier usable to communicate using a particular service type, such as telephony service.

From block 310 the logic next proceeds to block 312, where in response to the second user input that is received, the logic transmits a request for current prices for use of various available cellular services of various types to each cellular service provider and/or operator, and/or transmits such a request to a single entity (e.g., a coordinating server) that receives and stores price data for each network carrier/operator (or otherwise determines them). In some embodiments, the request transmitted at block 312 may include data related to the current location of the present device (such as GPS coordinates), data related to the type of service to be used to execute the function described above, data related to the particular function to be executed, and data related to the quality of the service(s) as determined at block 310 so that the prices may be identified or determined by the cellular network carriers/operators based on the current location, the type of service, the function to be executed, and/or the quality. The requests may be transmitted using the Internet or another network, accessible to the present device and connected to another device, and/or to the carriers/operators themselves, from which the pricing data may be acquired.

Still in reference to FIG. 3, after block 312 the logic moves to block 314. At block 314 the logic receives pricing data from one or more cellular network carriers/operators in response to the request transmitted at block 312, where the pricing data may comprise one or more prices (e.g., itemized by service type) from the carriers/operators to use their network's service(s) of a particular type at the current location, to use to execute the particular function discussed above, and/or to use while the service is available at the indicated quality. Thus, it is to be understood that the prices that are received as part of the pricing data may vary (e.g., based on network operator/carrier preference and parameters) based on current time, current location of the present device, quality of service of a particular service type that is available at the location, the function to be executed, etc. Moreover, though not shown on the face of FIG. 3, it is to also be understood that in some embodiments, such as based on user preference and/or network operator/carrier preference, virtual SIM data for using one or more of the networks (and/or service types) may be received with the pricing data at block 314 (e.g., if this data was not received at another point or if it is to be updated).

In any case, at block 316 this data may be presented on a user interface (UI) as one or more selectable options, such as on the UI 500 to be described above. From block 316 the logic may move to block 318 where the logic receives third user input selecting one of the options to thus enable the present device to execute the particular function at the price associated with the selected option using a service associated with the selected option. For instance, the third user input may be received via receiving touch input directed to an option presented on the UI 500.

In addition to or in lieu of the foregoing, but also at block 318, the logic may, in response to receipt of the data at block 314, automatically without further user input determine one of the options to use to execute the particular function based at least in part on one or more of the quality of service available at the current location (e.g., selecting the best available quality of service for a particular service type), the service type to be used (e.g., if only one service of the type to be used is available), the prices received from the carriers/operators (e.g., selecting the cheapest price for a service of the particular service type), and/or the particular function (e.g., if only one service usable to execute the particular function is available).

Then, in response to the user input received and/or automatic determination made at block 318, at block 320 the logic uses virtual SIM data stored at the present device to communicate with another device (e.g., another end-user device, a server, etc.) using a network and/or service type associated with the option selected and/or determined to be used at block 318. For instance, the present device may enable communication over a network by using the present device's SIM or another storage area (e.g., if the present device does not have a physical SIM) to access and identify virtual SIM data stored therein for use of the selected network and transmitting this virtual SIM data, using a network transceiver (e.g., wireless communication transceiver), to a device associated with the network carrier/operator (e.g., a cell tower, a base station, a server, etc.) to identify (e.g., using a SIM identity number) and authenticate (e.g., using a SIM key) the present device to thus gain access to the network associated with the selected option to then communicate with other devices over the network.

Still further, note that in some embodiments at block 320 the logic may concurrently communicate using another network and/or service type as well, such as continuing to communicate via telephony service while data service is enabled and then used to communicate over the Internet. For instance, the present device may use its cellular transceiver and/or communication interface to maintain dual lines of communication over different frequencies to respectively communicate with other devices telephonically and using Internet service.

Regardless, it is to be understood that communication may be enabled at block 320 at least for a threshold length of time and/or while the selected service is available at the determined quality (or at least available at plus or minus a threshold amount from the determined quality) and then may be disabled thereafter, while the present device is located at the current location (or at least within a threshold distance of the determined location) and then may be disabled thereafter, and/or while executing the particular function discussed above and then may be disabled thereafter. In addition to or in lieu of the foregoing, note that communication may also be enabled as long as the price associated with the selected option remains effective and/or valid, and/or as long as the user chooses to maintain access to the network associated with the selected, option for communication (e.g., as determined based on user input to the present device).

Communication may be disabled by ending the connection and/or ceasing to maintain the connection at the present device's cellular transceiver being used to maintain the network connection, such as by deactivating the transceiver or ceasing to transmit data that is used in some embodiments to maintain the connection (e.g., so-called "keep-alive" packets).

Before moving on to the description of other figures, it is to be understood that that charges accrued for using the network service at the selected price may be assessed by the carrier/operator to an account and/or profile of the user identifiable based on the virtual SIM data used to access the network, such as one of the accounts and/or profiles initially accessed at block 300. The user may then pay as they go (e.g., prepay for an estimated amount he or she will use the network at the current price) and/or pay for accrued charges at a later time, such as on a monthly basis.

Continuing the detailed description, in reference to FIG. 4, it shows an example user interface (UI) 400 presentable on a display of the system 100 and/or a device undertaking the logic the FIG. 3. The UI 400 includes a prompt 402 asking whether a user wants the device to determine the quality level (s) of currently available networks and/or service types at the device's current location. Thus, a yes selector 404 is shown that is selectable to automatically without further user input determine the quality levels in accordance with present principles, while a no selector element 406 is also shown that is selectable to automatically without further user input decline to do so. Note that the UI 400 may be presented, for example, responsive to initiation, invocation, and/or execution of an application such as one of the ones launchable at block 300 as described above, responsive to accessing a network profile or network account associated with the user, responsive to a user request to present it, responsive to receipt of the first or second user input at blocks 304 or 308 as described above, etc.

In any case, responsive to selection of the selector 404 anchor based on other user input, prices may be retrieved and a UI 500 as shown in FIG. 5 may be presented that lists currently available prices for use of various network services based on the current quality levels. The UI 500 lists one or more options 502 respectively indicating prices for use of respective network services at the identified qualities of service. The options 502 are respectively selectable using the respective radio buttons 504 shown next to each option 502 to select that respective option, and hence the price and network service associated with that respective option. As may be appreciated from FIG. 5, the example options shown include a price per megabyte for two-bar quality data usage via a 3G network service on a first network, a price per megabyte for one-bar quality data usage via a 4G network service on a second network, a price per minute for three-bar telephony service on a third network, and a price per text message with "full" text messaging service on a fourth network. Additionally, though not shown, for clarity, it is to be understood that in some embodiments, each option 502 may indicate a range of time during which the current prices are valid or a time until the current prices expire.

Figure 6:
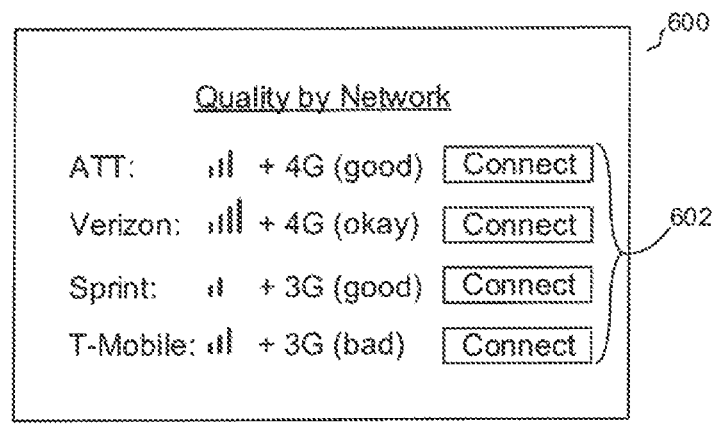

Reference is now made to FIG. 6, which shows another example UI 600 presentable on a display of a device undertaking present principles. The UI 600 may be presented, e.g., responsive to selection of the selector 404 and/or based on receipt of other user input such as responsive to the first user input described above, in reference to block 304 (e.g., responsive to user input to initiate a telephone call). In any case, the UI 600 may in some embodiments include indications of prices for use of the various services, while in other embodiments such as is shown in FIG. 8 it may not. Regardless, the UI 600 itemizes quality of various networks services by carrier/operator of the respective services. As may be appreciated from the items listed on the UI 600, in this example a first carrier's quality of telephony service at the current location corresponds to three bars of service on an example service scale from one to four (e.g., as established by the carrier and/or device based on telephony signal strength) while the first carrier's quality of 4G data service is indicated as "good" on a scale from bad to acceptable to good (e.g., as established by the carrier and/or device based on bandwidth strength). A second carrier's quality of telephony service at the current location corresponds to four bars of service on the service scale while the second carrier's quality of 4G data service is indicated as "okay" (e.g., acceptable) on the scale from bad to acceptable to good. A third carrier's quality of telephony service at the current location corresponds to two bars of service on the service scale while the third carrier's quality of 3G data service is indicated as "good" on the scale from bad to good. A fourth carrier's quality of telephony service at the current location corresponds to three bars of service on the service scale while the third carrier's quality of 3G data service is indicated as "bad" on the scale from bad to good.

Note that each of the items listed on the UI 600 has a respective connect selector 602 juxtaposed adjacent thereto. Each connect selector 602 is understood to be selectable (e.g., using touch input) to select one or both of the associated services indicated for the respective item, and/or to enable communication of the device over one or both service types for the respective carrier/operator that is indicated. Although one selector for each item is shown, note that one selector may be presented for each respective service type of each respective carrier in other embodiments. For instance, connect selectors 602 may be juxtaposed next to each bars of telephony service indication and next to each data service indication.

Continuing now in reference to FIG. 7, another example UI 700 is shown. The UI 700 may be presented, e.g., responsive to selection of an option from the UI 500, responsive to selection of a connect selector 602 from the UI 600, and/or otherwise responsive to enablement of communication through a given cellular network service using virtual SIM data in accordance with present principles. The UI 700 includes an indication 702 that may indicate information pertaining to one or more of a network service type currently being used, the name of the network and/or name of the operator/provider of the network, the price for communication using the service at the current quality level, the current quality level of the service itself the function being executed for which the service is being used, etc. The indication 702 may be accompanied by a selector 704 selectable to automatically without further user input disconnect from the currently used network service and/or otherwise disable communication using it.

In addition, in some embodiments the UI 700 may include an indication 706 of one or more other services and/or service types currently being used by the device, such as a telephony service from a different provider being concurrently used at five cents per minute of talk at the signal quality of two bars. The indication 706 may be accompanied by a disconnect selector 708 selectable to automatically without further user input disconnect from that currently used network service.

Still further, in some example embodiments the UI 700 may also list one or more other currently available options 710 indicating respective other currently available services (e.g., of the same service type(s) already being used), carriers/operators respectively associated therewith, prices for use of the other respective currently available network services, and/or their respective current qualities levels at the device's current location. This list of other currently available options may automatically and dynamically update, e.g., in real time (or at least substantially in real time owing to data processing and resource constraints) as prices, available networks, device location, and/or service quality change and/or become available over time. Thus, it is to be understood that even though connected to one (or plural) cellular networks for communication, other prices may be periodically determined and/or continually determined by the device (e.g., as a background process), such as via the connected-to cellular network or through another network connection such as a Wi-Fi connection. In any case, each respective other currently available network option 710 may be respectively accompanied by a connect selector 712 selectable to automatically without further user input disconnect and/or disable communication over the currently connected-to cellular service of the same service type as the respective option 710 and connect to and/or enable communication using the service type associated with the respectively selected option 710 at the price indicated and using virtual SIM data in accordance with present principles.

Moving on, FIG. 8 will now be described. FIG. 8 shows an example UI 800 presenting a notice 802 that a quality of a currently connected-to cellular service that is being used is changing, indicating the currently connected-to network carrier/operator, and indicating the change in quality. Though not shown for clarity, if there is a price difference in using the service at the new available quality that may be indicated as part of the notice 802 as well.

As may be appreciated from FIG. 8, a continue selector 804 may be presented on the UI 800 that is selectable to automatically without further user input continue to maintain the current service connection. A disconnect selector 806 is also shown that is selectable to automatically without further user input disconnect from the currently connected-to service either immediately (e.g., responsive to selection of the element 806) or at time at which the service quality changes. Furthermore, one or more other options 808 associated with other currently available network services and their respective prices for use may also be presented on the UI 800, along with respective connect selectors 810 selectable to automatically enable communication using those associated services.

Figure 9:
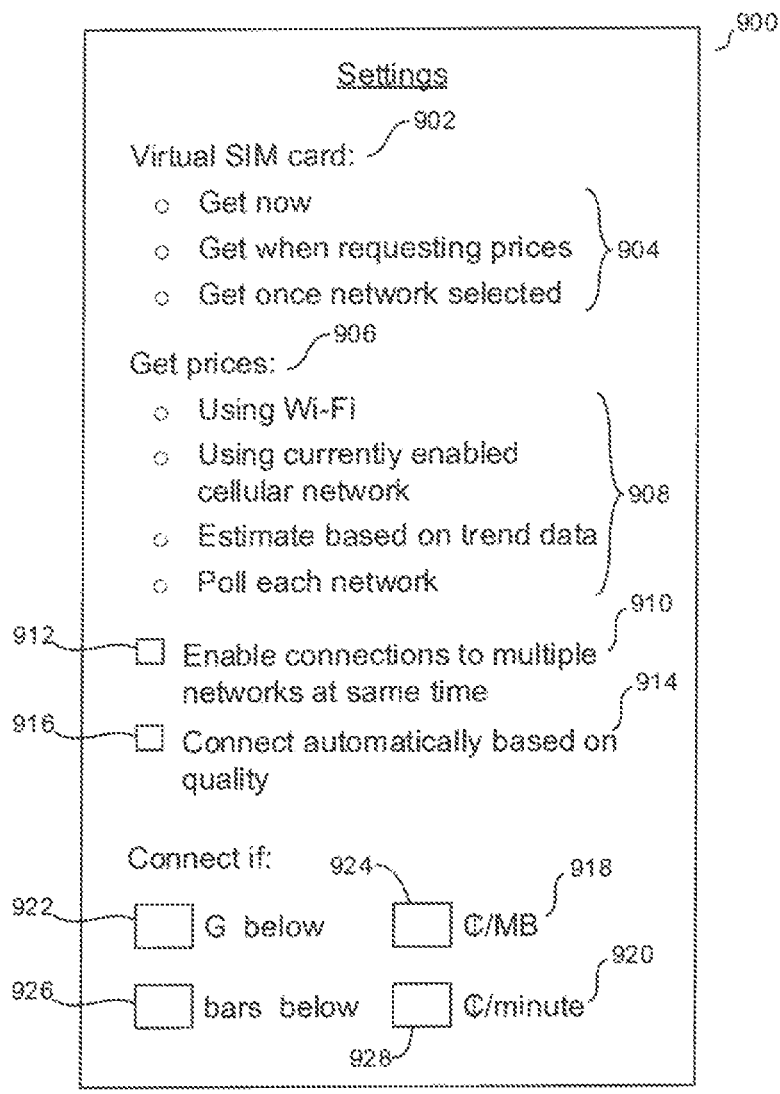

Continuing now in reference to FIG. 9, it shows an example settings UI 900 presentable on a display of the system 100 and/or a device undertaking the logic the FIG. 3. The UI 900 includes a first setting 902 related to acquisition of virtual SIM data from one or more network operators/carriers and listing options 904 respectively selectable using the radio buttons shown next to each option to acquire the virtual SIM data responsive to selection of the first option shown for setting 902, to acquire the virtual SIM data when requesting current prices for using respective cellular network services, and to acquire the virtual SIM data once a network service has been selected.

The UI 900 also includes a setting 906 related to how the device is to acquire currently available prices for use of various cellular networks and listing options 908 respectively selectable using the radio buttons shown next to each option to acquire currently available prices using a Wi-Fi connection, using a currently connected-to cellular network and/or network service, using general trend data available to the present device to then estimate or extrapolate a currently available price based on past prices, past quality levels, etc., and using each respective network to poll each cellular network carrier/operator for current prices prior to use a service of the network.

Still in reference to FIG. 9, the UI 900 may also include an option 910 enableable using check box 912 to allow the device to connect to and use multiple network services at the same time, such as using a cellular telephony service through a first carrier while using a cellular data service through a second carrier. Still further, in some embodiments the UI may include an option 914 enableable using check box 916 to configure the device to subsequently and automatically without further user input connect to particular cellular network and/or service based on the particular cellular network and/or service being the best available quality of all available networks/services, as determined by the device, and/or based on a particular function to be executed.

The UI 900 of FIG. 9 may also include options 918 and 920 to automatically connect to a particular cellular data service if a threshold level of quality (which may be established using input box 922) is offered below a threshold price (which may be established using input box 924) and to automatically connect to a particular cellular telephony service if a threshold level of quality (which may be established using input box 926) is offered below a threshold price (which may be established using input box 928). Even further, though not shown for clarity, in some examples an option may be included that is enableable to switch which virtual SIM data is being used based on a country in which the device is located, so that calling and data services may be used at the lowest possible rate for that country rather than an out-of-country international rate that may otherwise be applied.

Figure 10:
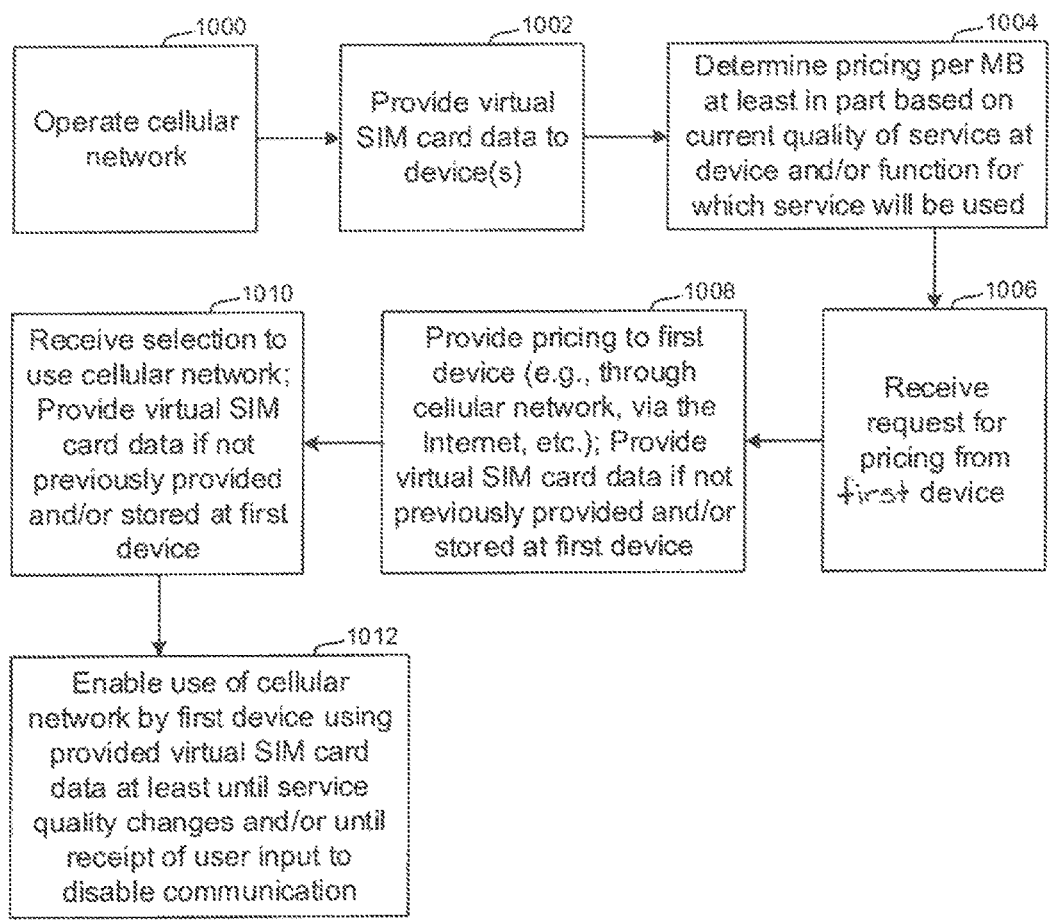

Reference is now made to FIG. 10, which shows example logic that may be undertaken by a device of a cellular network carrier/operator, such as a cell tower computer, base station computer, carrier/operator server, carrier/operator control, device, etc. Beginning at block 1000, the logic operates a cellular network, such as fey enabling devices to communicate with each other using the network's services and/or making its network services available for such communication. The logic then moves to block 1002 where the logic provides virtual SIM data useful for accessing its network to one or more other devices, such as a user's smart phone.

After block 1002 the logic then proceeds to block 1004 where the logic determines, based on one or more service quality level's and/or various functions to be executed, a price per byte, price per increment of time of telephonic communication, and/or price per text message sent and/or received. The logic may do so at block 1004 based on input specified by and received from an administrator of the cellular network, based on data in a data table correlating service qualities with prices for use at those quality levels (e.g., so that the price is directly correlated to network service quality (and hence, for instance, prices may be cheaper for one quality level than for a higher quality level)), etc.

From block 1004 the logic of FIG. 10 moves to block 1006. At block 1006 the logic receives from a first device a request for a current price(s) for using a cellular network service at a particular quality level. Responsive to receipt of the request at block 1006, at block 1008 the logic provides one or more applicable prices to the first device (such as through the cellular network itself or via the Internet). Also at block 1008 in some embodiments, the logic may provide virtual SIM data to the first device, such as based on a received request for the data and/or if not previously provided to or stored at the first device.

Then at block 1010 the logic receives a selection and/or request from the first device to use one of the cellular network services at the currently available price. Also at block 1010 in some embodiments, the logic may provide virtual SIM data to the first device, such as based on a received request for the data, and/or if not previously provided to or stored at the first device. But in any case, from block 1010 the logic then moves to block 1012 where the logic enables use of the cellular network service by the first device using the virtual SIM data (e.g., after identifying and authenticating the first device) and while the quality of the service remains the same at the first device, and/or until user input is received to disable communication using the cellular network service.

Reference is now made to FIG. 11, which shows a data table 1100 accessible to a device undertaking the logic of FIG. 10 and correlating amounts of bandwidth of one or more data service types (e.g., 3G or 4G) with prices for use of the services while quality is at those amounts. The table 1100 includes a first column 1102 indicating ranges of amounts of available band width of a particular data service type (expressed as variables in the present example for simplicity) and a second column 1104 indicating prices per increment for using the network service while at the respective quality level range indicated in column 1102.

Accordingly, as an example, a device undertaking the logic of FIG. 10 may, at block 1004, access the data table 1100. Then, based on an identified service quality, the logic may parse the entries in column 1102 until a match is made at column 1102 to the identified service quality (e.g., that the identified service quality falls within the range noted in the entry). The logic may then move horizontally across the data table 1100 to column 1104 to identify the price per increment to be offered for using the network service while the service quality is at the identified level.

Moving on, FIG. 12 shows at example UI 1200 for a network administrator to enter or specify a price (at input box 1202) per increment (at input box 1204) for using a network service while the service is at a particular quality level (e.g., or a range as provided to input boxes 1206 and 1208). The information entered to the UI 1200 may then be stored and used, for example, at block 1004 of FIG. 10 to identify a current price for use of the network per the earner/operator's preference.

It is to be generally understood that present principles may be applied for use in still other networks besides cellular networks, such, as Wi-Fi networks. It is to also be understood that in some embodiments, end-users of the devices undertaking present principles (e.g., devices undertaking the logic of FIG. 3) may use a UI to offer to carriers/operators a price per increment they are willing to currently pay for usage of the carrier/operator's cellular network service at its current quality level at the device, which may then be electronically submitted to the carriers/operators and the carriers/operators may then accept or decline and hence allow or disallow use of their network using virtual SIM data at the end-user offered price.

It may now be appreciated that present principles allow a user to have several virtual SIMs stored in their phone or computer, where different service plans can be subscribed to using those virtual SIMs. A user is able to select among the different plans and virtual SIMs to choose one that has a better offer for, e.g., calling versus data usage. A user may also use a virtual SIM that provides the best flexibility for a desired function. For example, a child can use the virtual SIM for a service that offers relatively high data bandwidth but possibly minimal low-cost telephony coverage options at a single cost even if just to watch a film using fee data service but not place a telephone call. As another example, an international SIM may be used when traveling outside the user's country of residence rather than paying higher costs for telephony service in another country while using the device's domestic SIM used mostly when the device is in the user's country of residence. Furthermore, a user may set tip a profile to allow a background process on the device to decide, based on content and activity, a most cost-effective plan. Present principles also recognize that two virtual SIMs may be used concurrently so that, for example, a user may use one virtual SIM to access a low-cost telephony service to make a telephone call while using another virtual SIM to access a low-cost data service to view a web page.

Before concluding, it is to be understood that although a software application tor undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium, is not a transitory signal and/or a signal per se.

While the particular USAGE OF NETWORK BASED ON QUALITY OF NETWORK AT A PARTICULAR LOCATION is herein shown and described in detail it is to be understood that the subject matter which is encompassed by the present application is limited only by the claims.

What is claimed is:

1. A first device, comprising:
a processor; and
storage accessible to the processor and bearing instructions executable by the processor to:
determine a quality, at a location, of service for a first service of a particular cellular service type, the first service associated with a first cellular service provider;
at the first device, use first subscriber identification module (SIM) data to communicate at least with a second device through the first service, the second device being different from the first device;
at the first device and concurrently with use of the first SIM data to communicate at least with the second device through the first service, use second SIM data different from the first SIM data to communicate through a second service different from the first service, the second service associated with a second cellular service provider different from the first cellular service provider;
determine a cost for using the first service; and
based at least in part on the cost for using the first service, and the quality of service, use the first SIM data to communicate at least with the second device through the first service.

2. The first device of claim 1, wherein the quality of service pertains to one or more of: an amount of the first service that is available at the location, a signal strength of the first service at the location, an amount of bandwidth of the first service at the location.

3. The first device of claim 1, wherein the location is a current location of the first device.

4. The first device of claim 1, comprising a subscriber identification module (SIM) accessible to the processor, wherein the SIM stores at least the first SIM data, and wherein the instructions are executable by the processor to:
based on one or more of user input and the quality of service at the location, use the first SIM data as stored in the SIM to communicate at least with the second device through the first service.

5. The first device of claim 4, wherein at least the first SIM data comprises virtual SIM data.

6. The device of claim 1, wherein the particular cellular service type is of a first cellular service type, and wherein the second service is of a different cellular service type than the first cellular service.

7. The first device of claim 1, wherein the first service is associated with a first at least partially wireless network operated by the first cellular service provider, and wherein the second service is associated with a second at least partially wireless network operated by the second cellular service provider.

8. The first device of claim 1, wherein the particular cellular service type is selected from the group consisting of: a third generation (3G) mobile communication type, a fourth generation (4G) mobile communication type.

9. The first device of claim 1, wherein the instructions are executable by the processor to:
determine the particular service type and determine the quality of service at the location; and
based on the particular service type, and the quality of service at the location, use the first SIM data to communicate at least with the second device through the first service.

10. The first device of claim 1, wherein the instructions are executable by the processor to:
determine a function to be executed at least in part at the first device and determine the quality of service at the location; and
based on the function to be executed at least in part at the first device, and the quality of service, use the first SIM data to communicate at least with the second device through the first service.

11. A method, comprising:
identifying a first quality, at a location of a device, of a first available cellular service;
identifying a second quality, at the location, of a second available cellular service;
presenting, on a user interface (UI), a first option at the device along with an indication of the first quality, the first option being selectable to command the device to communicate through the first available cellular service;
concurrently with presenting the first option, presenting a second option on the UI along with an indication of the second quality, the second option being selectable to command the device to communicate through the second available cellular service;
receiving, at the UI, a selection of one of the first and second options; and
in response to receiving the selection, communicating using the device through the respective available cellular service associated with the selected option, wherein the UI indicates information pertaining to a price to communicate using the first available cellular service, and wherein the UI indicates information pertaining to a price to communicate using the second available cellular service.

12. A first device, comprising:
a processor;
a display accessible to the processor; and
storage accessible to the processor and bearing instructions executable by the processor to:
present a settings user interface (UI) on the display, the settings UI comprising an option that, once selected a single time, enables the first device to automatically connect to plural different cellular service providers in the future based on respective qualities of service at a given location for the different cellular service providers so that one of the different cellular service providers that offers a best available quality of service at the given location can be used for communication by the first device with a second device while at the given location;
receive a single instance of input to the setting UI that selects the option;

responsive to the single instance of input to the settings UI that selects the option, enable the option;

determine qualities, at a first location, of service for first and second cellular service providers; and based on enablement of the option from the settings UI and based on the qualities of service at the first location, use subscriber identification module (SIM) data stored at the first device to automatically connect to one of the first and second cellular service providers that offers a best available quality of service at the first location.

13. The first of claim 12, wherein the settings UI is a first UI, and wherein the instructions are executable to:

present a second UI on the display, wherein the second UI indicates information pertaining to a price to communicate using the first cellular service provider, and wherein the second UI indicates information pertaining to a price to communicate using the second cellular service provider.

14. A method, comprising:

presenting a settings user interface (UI) on a display of a first device, the settings UI comprising an option that, once selected a single time, enables the first device to automatically connect to plural different cellular service providers in the future based on respective qualities of service at a given location for the different cellular service providers so that one of the different cellular service providers that offers a best available quality of service at the given location can be used for communication by the first device with a second device while at the given location;

receiving a single instance of input to the settings UI that selects the option;

responsive to the single instance of input to the settings UI that selects the option, enabling the option;

determining qualities, at a first location, of service for first and second cellular service providers; and based on enablement of the option from the settings UI and based on the qualities of service at the first location, using subscriber identification module (SIM) data stored at the first device to automatically connect to one of the first and second cellular service providers that offers a best available quality of service at the first location.

15. The method of claim 14, comprising:

determining a cost for using the first and second cellular service providers; and based at least in part on the cost for using the first and second cellular service providers, using the SIM data to automatically connect to the one of the first and second cellular service providers that offers the best available quality of service at the first location.

16. The method of claim 14, wherein the settings UI is a first UI, and wherein the method comprises:

presenting a second UI on the display, wherein the second UI indicates information pertaining to a price to communicate using the first cellular service provider, and wherein the second UI indicates information pertaining to a price to communicate using the second cellular service provider.

\* \* \* \* \*